United States Patent [19]
Nimberger

[11] Patent Number: 6,155,295
[45] Date of Patent: Dec. 5, 2000

[54] LOW EMISSION DISCONNECT SYSTEM

[75] Inventor: Spencer M. Nimberger, Houston, Tex.

[73] Assignee: PGI International, Ltd., Houston, Tex.

[21] Appl. No.: 09/531,634

[22] Filed: Mar. 21, 2000

[51] Int. Cl.⁷ .................................................. F16K 31/122
[52] U.S. Cl. ...................... 137/614; 137/614.2; 137/535; 137/543.21; 251/148
[58] Field of Search .................................. 137/614, 614.2, 137/614.01, 528, 535, 538, 540, 543.17; 251/315.01, 148

[56] References Cited

U.S. PATENT DOCUMENTS

| | | |
|---|---|---|
| 2,440,946 | 5/1948 | Hansen . |
| 2,872,216 | 2/1959 | Kaiser . |
| 3,159,180 | 12/1964 | Courtot et al. . |
| 4,023,773 | 5/1977 | Wise ........................................ 251/148 |
| 4,124,036 | 11/1978 | Rogers ................................. 251/148 X |
| 4,335,747 | 6/1982 | Mitsumoto et al. . |
| 4,438,779 | 3/1984 | Allread . |
| 4,664,149 | 5/1987 | Fremy . |
| 5,083,588 | 1/1992 | Truchet . |
| 5,095,946 | 2/1992 | McLennan . |
| 5,099,883 | 3/1992 | Maiville . |
| 5,215,121 | 6/1993 | Michl ..................................... 137/614.2 |
| 5,284,182 | 2/1994 | McLennan . |
| 5,295,507 | 3/1994 | Bandy et al. . |
| 5,332,001 | 7/1994 | Brown . |
| 5,402,825 | 4/1995 | McCracken . |
| 5,546,976 | 8/1996 | Farguhar .......................... 137/614.2 X |
| 5,947,142 | 9/1999 | Nimberger et al. . |

*Primary Examiner*—Kevin Lee
*Attorney, Agent, or Firm*—Browning Bushman

[57] ABSTRACT

A low emission fluid disconnect 10 is provided along a flexible flow line 12 for transmitting fluid from the transport 16 to a bulkhead 14. The disconnect includes a ball valve 32 including a ball 31 rotated between the opened and the closed positions about a stem axis. The disconnect also includes union housing 64 and a female body 58 for threaded engagement with the ball valve. A poppet sleeve 82 is linearly moveable within the union housing between the opened and closed positions, and has an end surface 104 substantially conforming to an exterior surface of the ball. The poppet member is guided when moving between the opened and closed positions. A very low volume of fluid is released when the union housing is disconnected from the ball valve.

20 Claims, 6 Drawing Sheets

LOW EMISSION DISCONNECT SYSTEM

FIELD OF THE INVENTION

The present invention relates to a fluid disconnect system of the type commonly used in flow lines. More particularly, this invention relates to a fluid disconnect system which may be used along a flexible flow line which connects a fluid transport vehicle with a stationary bulkhead. The disconnect system of the present invention offers very low emission of fluid during a disconnect operation, thereby saving fluid and reducing environmental contamination.

BACKGROUND OF THE INVENTION

Fluid disconnects in flow lines are used in various application, including flow lines which interconnect an anhydrous ammonia bulkhead with a portable transport. The primary purpose of the disconnect is the ease of separation along this flow line, along with the ease of reconnecting the flow line to another portable transport.

While various types of disconnects are commercially available, many of these disconnects allow for a significant loss of fluid during disconnect separation. Each time the disconnect is separated, a sizeable amount of fluid escapes before the disconnect valves seal, and this escaping fluid, in addition to the fluid which is normally spaced between the closed valves of the disconnect, escapes to the atmosphere. This loss of fluid commonly is at least several hundred CCs of liquid, and the lost fluid both contaminates the soil surrounding the bulkhead station and vaporizes to contaminate the atmosphere. Other fluid disconnect systems cannot operate reliably at high fluid flow rates and/or high pressure, thereby limiting the use of the disconnect in systems where the time required to transmit fluid through the flexible flow line is at a premium.

The disadvantages of the prior art are overcome by the present invention. An improved flow emission disconnect system is hereinafter disclosed which is particularly suitable for use in a flexible flow line extending from a transport to a bulkhead. The fluid disconnect system is rated at a high flow rate and a high pressure, and most importantly the disconnect system results in a very slight loss of fluid as a result of the disconnect operation.

SUMMARY OF THE INVENTION

A low emission disconnect is provided for positioning along a fluid flow line, e.g., along a flexible flow line interconnecting an anhydrous ammonia bulkhead with a portable transport. The disconnect includes a valve body with a ball mounted therein and rotatable about a stem axis, a union housing, and a female body for threaded engagement with the valve body to bring the union housing into seal engagement with the valve body. A poppet member within the union housing is linearly moveable from an opened position to a closed position, and has a upstream end surface substantially conforming to an exterior surface of the ball when the ball is closed. An upstream end of the poppet member has an exterior cylindrical surface for guided engagement with the interior cylindrical surface on the union housing, and one or more guide member provide for guiding movement of the poppet member with respect to the union housing between the opened and the closed position. A coil spring biases the poppet member in the closed position.

It is an object of the invention provides a low emission disconnect which may be reliably used along a flexible flow line, wherein the disconnect components, when disconnected, result in a very low loss of the fluid being transported through the disconnect. A related object of the invention provide a disconnect which does not substantially restrict the flow of fluid along the flow line when the disconnect is in the opened position.

It is a feature of the invention that the disconnect include a poppet member which is linearly moveable along a relatively long stroke length between the opened and the closed positions, thereby resulting in a relatively low pressure drop across the disconnect when a high volume of fluid is transmitted through the disconnect. A related feature of the invention is that the disconnect is designed so that the same valve body and valve ball may be used to connect with either a low emission female body and union housing, or with a conventional female body and union housing.

A significant advantage of the low emission disconnect is that the disconnect may be reliably used by relatively inexperienced personnel.

These and further objects, features, and advantages of the present invention will become apparent from the following detailed description, wherein reference is made to the figures in the accompanied drawings.

DETAILED DESCRIPTION OF PREFERRED EMBODIMENTS

Figure 1:
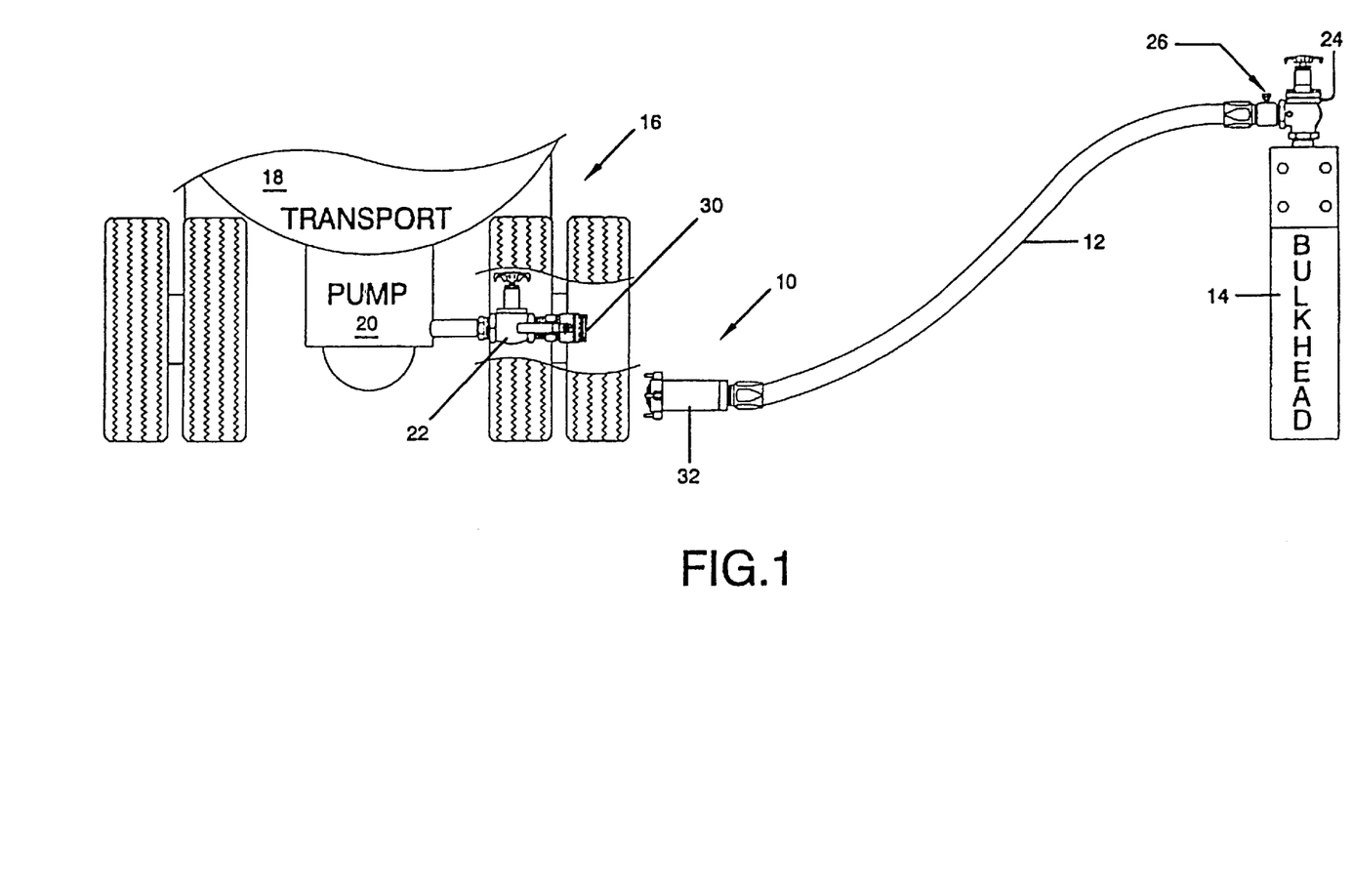
FIG. 1 is a simplified pictorial view of a low emissions disconnect according to the present invention positioned along a flexible flow line interconnecting a bulkhead with a transport.

FIG. 1 illustrates a suitable application for a low emission disconnect 10 according to the present invention, with the disconnect in FIG. 1 shown in a separated condition. Fluid disconnect 10 is provided along a flexible flow line 12 which, as shown in FIG. 1, transmits the flow of fluid from a portable transport 16 to bulkhead 14. The flow line 12 and components along the flow line may be reversed for transmitting fluid from the bulkhead 14 to the transport 16. In the application as shown in FIG. 1, fluid is normally conveyed from a transport to the bulkhead, and thus the transport 16 includes a storage tank 18 and a pump 20 for pumping fluid along the flexible flow line 12 to the bulkhead. A control valve 22 is commonly provided immediately upstream from the disconnect 10. The bulkhead 14 includes another conventional valve 24 and a hydrostat 26. When disconnected, FIG. 1 illustrates that the flexible hose 14 stays with the bulkhead. The disconnect 10 includes a selectively actuatable valve member 30 and a union member 32, which are shown in greater detail in FIG. 2.

Figure 2:
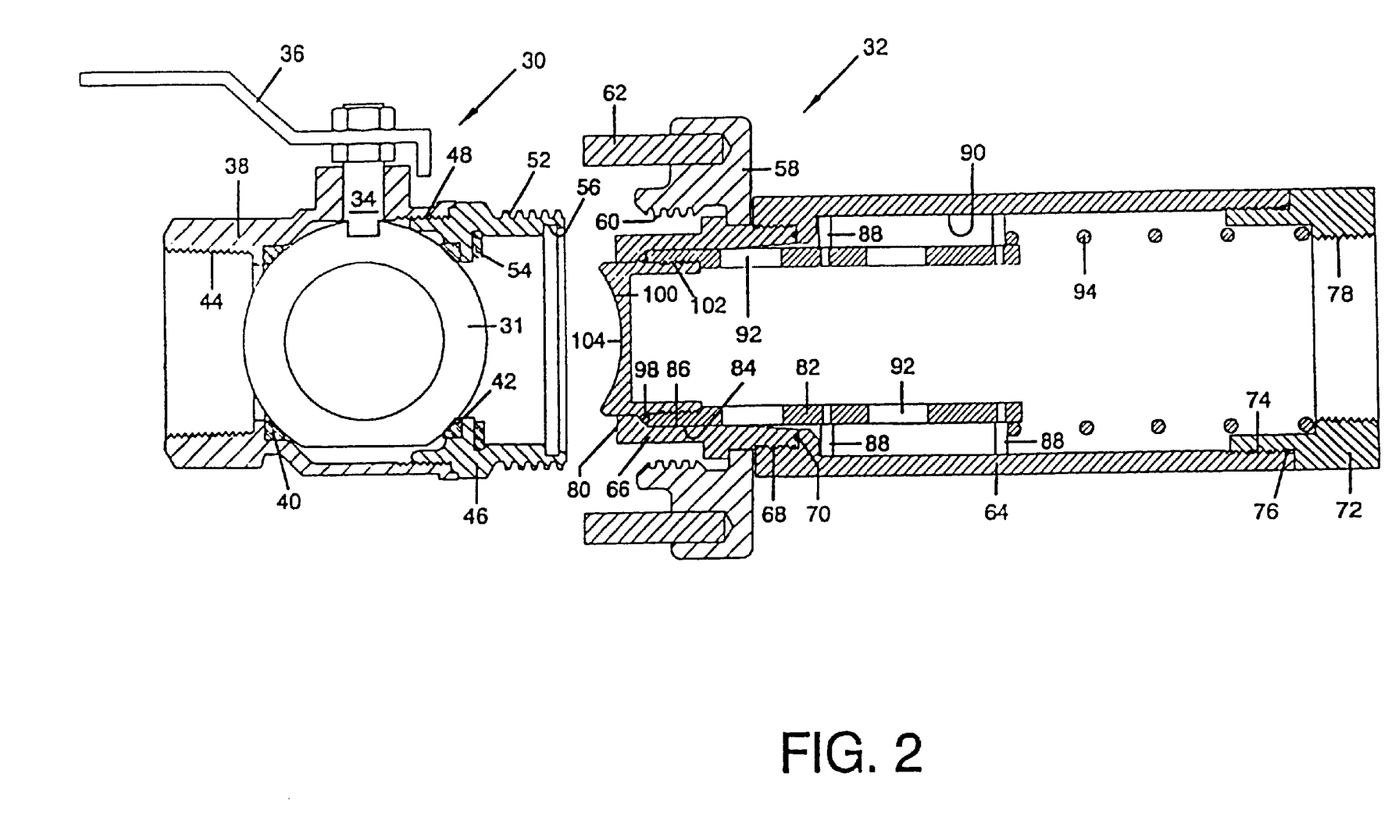
FIG. 2 is a cross-sectional view of the disconnect shown in FIG. 1 in the disconnected position.

As shown in FIG. 2, the valve member 30 includes a conventional ball 31 which is rotatable from an opened position to a closed position by rotation of a stem 34. The stem 34 may be rotated by a conventional valve handle 36. Alternatively, a powered valve actuator may be used to rotate the stem 34 and thus the ball 31. The ball 31 is shown in FIG. 2 in the closed position within the valve body 38, with an upstream seal 40 and a downstream seal 42 providing sealing engagement with the ball. The threads 44 may thus be connected to a hose or a short section of pipe, which in turn is connected to the valve 22 shown in FIG. 1. The tail piece 46 is threadably connected to the valve body 38 by threads 48, and includes external threads 52 and a seal 54 designed for engagement with the union member 32 as discussed below. Another annular groove 56 is provided within the tail piece 46, and is also discussed below.

The union member 32 includes a female hammer component 58 with an internal thread 60 for mating engagement with the external threads 52. A plurality of pins or protector members 62 may be circumferentially spaced about the hammer component 58. These protector members prevent the inadvertent release of pressurized fluid from the disconnected union member 32 in the event that the union member is dropped. Without the protector members 32, the end cap 100 discussed subsequently otherwise may engage a foreign object which would move the end cap within the housing 64. Various types of protection devices may be provided for serving this purpose, and the pins 32 are merely one mechanism for achieving this objective.

The hammer component 58 is conventionally rotated to apply a sufficient torque to the component 58 to reliably mate the disconnect. The female hammer component on female body 58 thus rotates about the elongate body 64. An upstream component 66 is threaded at 68 to the elongate union housing 64, with a stationary seal 70 providing static sealing engagement. A downstream component 72 is threaded at 74 to the opposing end of the elongate body 64, and a similar static o-ring 76 is shown. Internal threads 78 are provided on the downstream component 72 for engagement with a conventional threaded member (not shown in FIG. 2) provided on the end of the flexible hose 12. Alternatively, a rigid pipe may be threaded directly to the threads 78.

Referring now to FIGS. 1 and 2, the planar end face 80 of the upstream component 66 presses against the seal 54 when the hammer union 58 is threadably connected to the valve member 30, thereby providing a fluid-tight seal between the tail piece 46 of the valve member 30 and the upstream component 66 of the union member 32. A sleeve-shaped poppet member 82 has an external diameter cylindrical surface 84 which provides a relatively tight sliding fit with the internal diameter cylindrical surface 86 of the upstream component 66. A plurality of axially spaced guide pins 88 are each press fitted within a receiving aperture in the poppet sleeve 82. The guide pins 88 are sized such that the end surface of these pins slide along the internal surface 90 of the elongate housing 64, as explained subsequently. The interior cylindrical surface 86 has a diameter less than the diameter of the cylindrical surface of the downstream portion of the union housing 32 engaged by the pins 88. The plurality of flow apertures 92 are also circumferentially and axially spaced about the poppet sleeve 82, and fluid flows through these ports 92 when transmitting fluid through the disconnect 10. A conventional coil spring 94 is provided for biasing the poppet sleeve 82 toward the upstream member 66, thereby compressing the seal 98 which seals between the upstream component 66 and the poppet sleeve 82. An end cap 100 is threadably connected at 102 to the poppet sleeve 82, and includes an end surface 104 which forms a portion of a sphere. Most importantly, the contour of the surface 104 at least substantially confirms to the contour of the exterior surface of the ball 31, as shown in FIG. 2, so that very little volume is provided between the closed ball 31 and the end cap 100. The end surface 104 has a diameter substantially conforming to the diameter of seal 54. More particularly, the volume between the seal 42 which seals with the ball 31 and the seal 98 which seals with the upstream component 66 is less than 8 CCs for a disconnect sized for accommodating a 2 inch flexible low line, and preferably is about 5 CCs or less.

Figure 3:
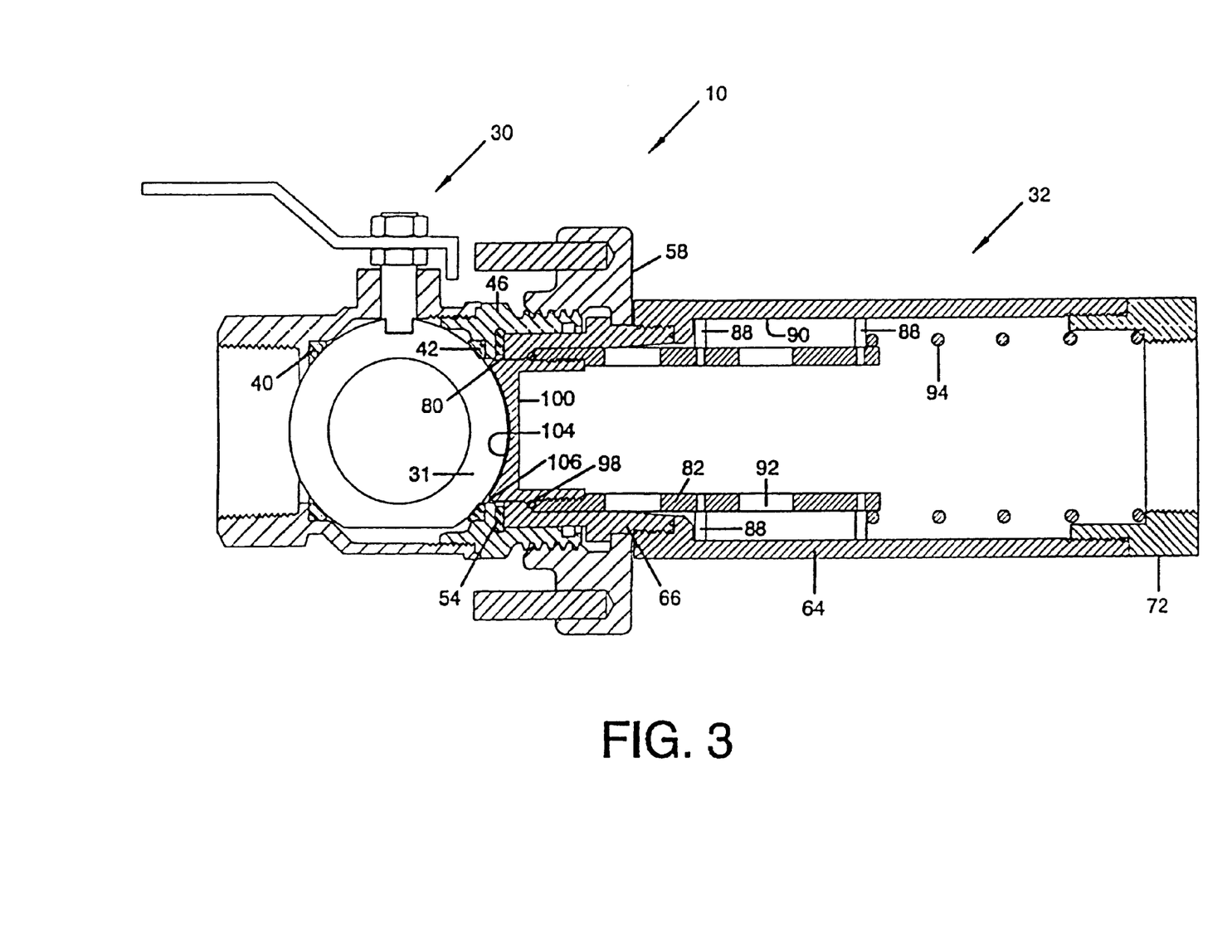
FIG. 3 is a cross-sectional view of the disconnect shown in FIG. 2 in the connected position.

The end surface 80 in the upstream component 66 is pressed against the seal 54 by the force resulting from the torqued engagement of the hammer union 58 with the threads 52. When the ball valve 32 is closed as shown in FIG. 3, the spring 94 thus biases the poppet sleeve 86 toward the ball, thereby compressing the seal 98 which seals between the upstream 66 and the poppet sleeve 82. When the ball 31 is closed and the hammer component 58 is loosened for manually disconnecting the ball member 30 from the union member 32, a very small volume 106 exists between the seals 42 and 98, and thus a very low volume of fluid will escape during the disconnect operation.

Figure 4:
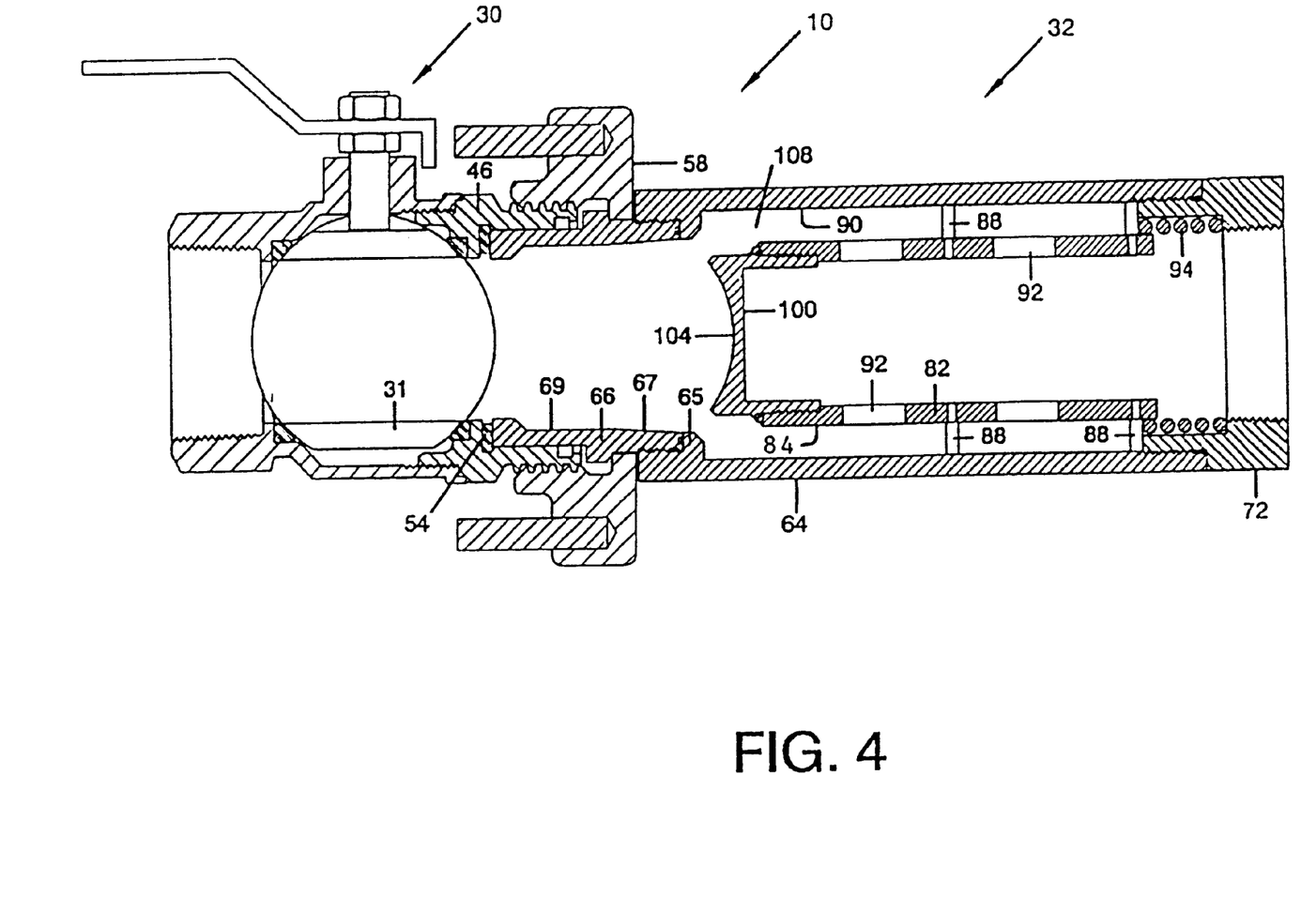
FIG. 4 is a cross-sectional view of the disconnect shown in FIG. 2 with fluid flowing through the disconnect.

FIG. 4 shows the assembled disconnect 10 with fluid flowing through the open ball member 32 and past the poppet sleeve 82. The force of the fluid flowing through the ball 31 thus presses against the end cap 100, thereby moving the poppet sleeve 82 away from the ball 31 and compressing the spring 94. As the poppet sleeve moves within the elongate housing 64, the sleeve 82 is guided initially by engagement of the surfaces 84 and 86, and both initially and subsequently by engagement of the guide pins 88 with the interior surface 90. Fluid flowing past the ball thus passes radially outward of the end cap 104 and into the annular spacing 108 between the housing 64 and the poppet sleeve 82. Fluid then flows radially inward through the ports 92 and the poppet sleeve, then continues to flow downstream through the downstream component or hose connect member 72.

It is a particular feature of the invention that the union member 32 is provided so that the poppet sleeve 82 moves a substantial axial distance from the closed to the opened position in response to fluid flow. Because of the relatively long movement or "stroke" of the poppet sleeve 82, it is important that the poppet sleeve be guided with respect to the elongate housing 64 during this movement, thereby ensuring that the poppet sleeve will reliably move back to the closed position as shown in FIG. 3 in response to the spring 94 when the ball valve 32 is closed. This guiding function is primarily achieved by the guide pins 88. The guide members 88 are spaced linearly opposite the end surface 104 with respect to the cylindrical surface 84. This guiding function is also obtained by providing a relatively close tolerance between the outer surface 84 of the poppet sleeve 82 and the inner surface 86 of the upstream component 66. This close tolerance thus also ensures that the seal 98 will form a reliably fluid-tight barrier between the poppet sleeve 82 and the upstream component 66.

Figure 5:
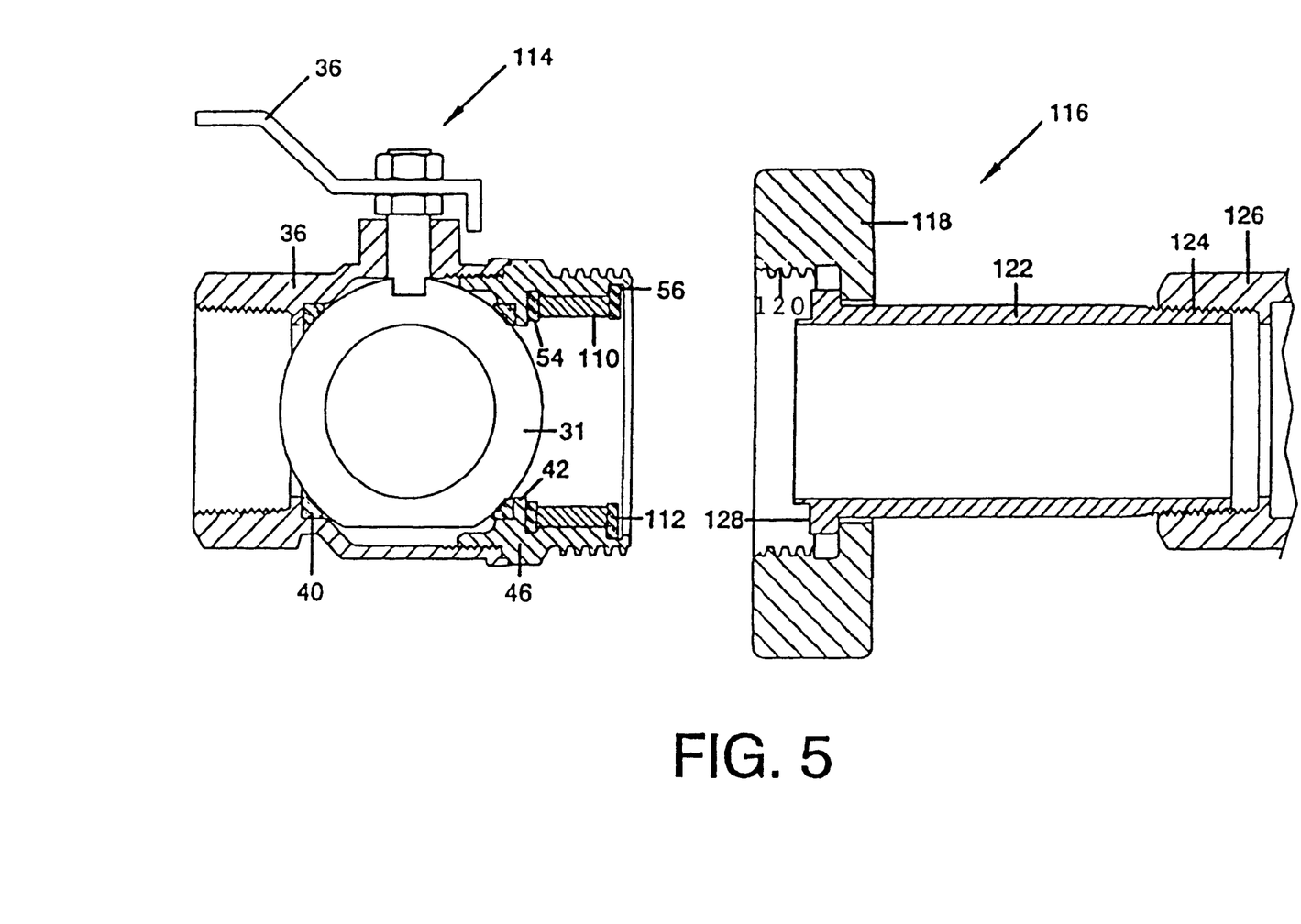
FIG. 5 illustrates the ball valve shown in FIGS. 2–4 adapted for mating engagement with a conventional union housing and female body.
Figure 6:
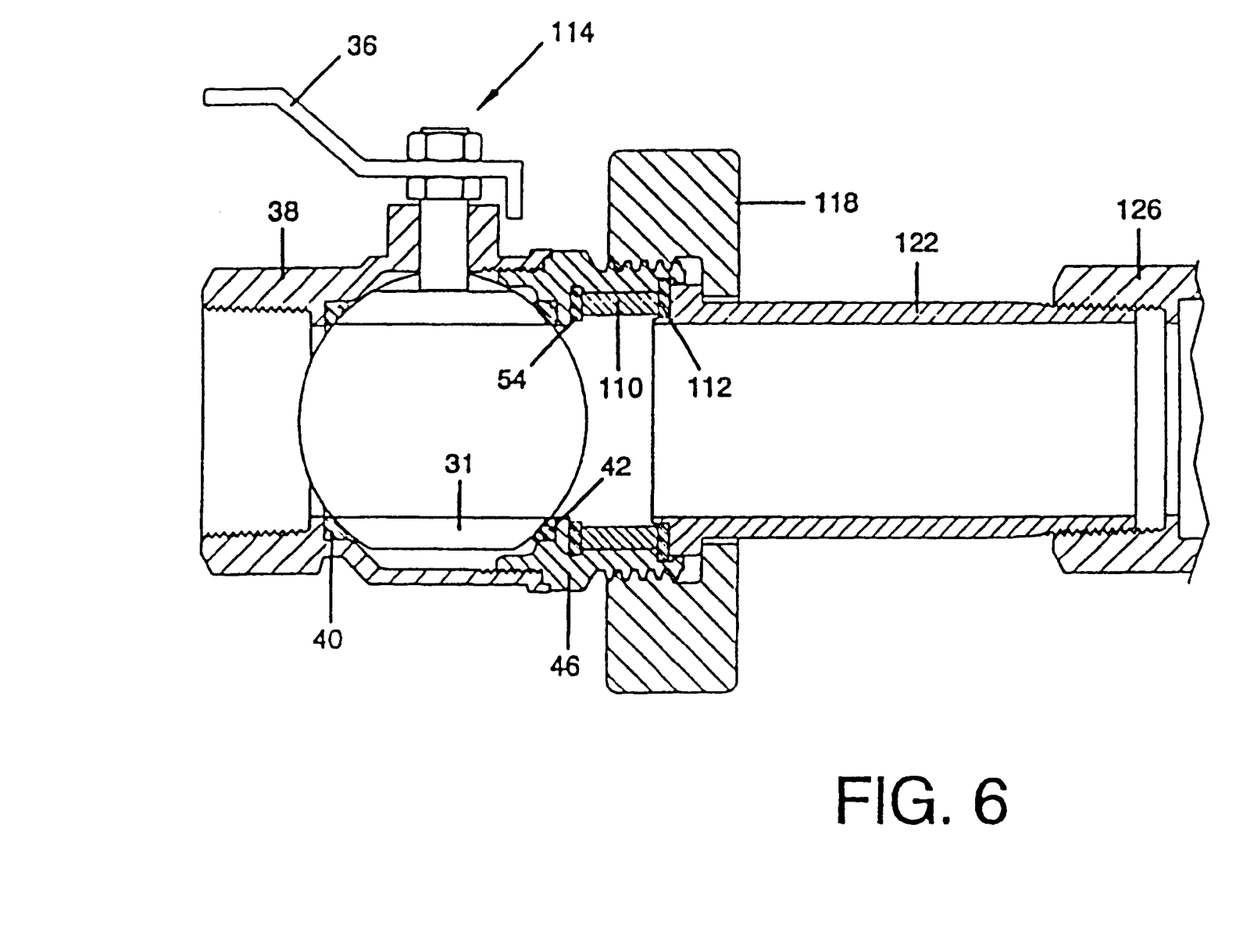
FIG. 6 illustrates the components shown in FIG. 5 in the connected position.

It is a feature of the present invention that the poppet sleeve 82 has a relatively long stroke, as discussed above. More particularly, the axial travel or stroke of the poppet sleeve 82 is greater than the nominal diameter of the flow path or flow passageway in the ball 31, and preferably is at least 25% greater than the diameter of the flow path in the ball 31. This long stroke is required since, as explained subsequently, it is also a feature of the invention that the valve member 30 be designed to be easily revised to accommodate a conventional union, as shown in FIGS. 5 and 6. In order to provide a disconnect which does not unduly restrict the flow of fluid through the disconnect when the valve 32 is opened, while also providing a reliable disconnect which minimizes the loss of fluid once the disconnect is manually separated, the poppet sleeve 82 has a substantial stroke between the opened and the closed position, as shown in FIGS. 3 and 4.

A related feature of the disconnect 10 is the slow "bleed-out" or return of the poppet sleeve 82 and the end cap 100 to the closed position as shown in FIG. 3 once the ball valve 32 is closed. With the ball 31 closed, fluid immediately downstream from the ball 31 becomes substantially trapped once the outer diameter surface 84 of the poppet sleeve 82 passes to the left past the internal stop 65 on the housing 64. As the poppet sleeve 82 continues to the left in response to the force of the spring 94, this annular gap or spacing minimizes due to the tapered interior surface 67 on the upstream component 66. Once the poppet sleeve 82 passes within the cylindrical surface 69 of the upstream component 66, only the slight tolerance gap between the O.D. of surface 83 and the I.D. of surface 69 allows for the escape of fluid past the end cap 100. This slow bleed of fluid desirably reduces the impact forces on the components when the ball 31 is closed, thereby prolonging the life of the disconnect.

Referring again to FIG. 1, there may be instances where the operator desires to connect the valve member 30 of the disconnect 10 with a conventional union, rather than the low emission union 32 as discussed above. This connection may be easily and quickly accomplished by inserting a short sleeve-shaped steel conversion spacer 110 as shown in FIG. 5 into engagement with the seal 54. Another seal 112 is then positioned against the spacer 110, and within the annular cavity 56 discussed earlier. With this slight modification, the converted valve member 114 may be reliably used with a conventional union 116. The conventional 116 thus includes a rotatable union member 118 having internal threads 120 for mating with the threads 52, and a sleeve shaped housing 122 having downstream threads 124 for sealing with an end 126 of a flexible hose. Referring to FIGS. 5 and 6, a planar end surface 128 is brought into engagement with the seal 112 when the union member 118 is threaded to the modified valve assembly 114, thereby providing a fluid-tight seal between the tail piece 46 and the union housing 122.

The assembly as shown in FIGS. 2–5 may thus be easily converted for receiving a standard union 116, and may then be easily returned for interconnection with the preferred union 32 shown in FIG. 2. FIGS. 5 and 6 also illustrate the disadvantages of a conventional disconnect. When the union 116 is separated from the valve assembly 114, a volume of fluid in the flexible hose 12 as shown in FIG. 1 between the valve 28 and the standard union 116 may be vented to atmosphere. A conventional flexible hose is approximately 12 foot long, and a standard 2 inch hose of that length houses approximately 2 gallons of fluid. Accordingly, a substantial volume of fluid may be easily lost when using a conventional disconnect. In some prior art disconnect systems, a check valve is provided at the transport end of the flexible hose 12 for minimizing the loss of fluid when the disconnect is separated. With this conventional check valve, approximately 400 CCs of liquid normally exists between the ball valve and the check valve, and thus 400 CCs are vented to atmosphere when each disconnect is broken. With the preferred low emission disconnect system of the present invention, a very low fluid volume is provided between the closed valve members 32 and 82 as shown in FIG. 3, and thus only approximately 5 CCs of liquid is lost during each disconnect. Moreover, the disconnect of the present invention is rated such that a two inch flow line may reliably transmit up to 350 gpm of fluid, so that the improved disconnect of the present invention does not cause a significant increase in the time required to pass fluids from the transport to the bulkhead.

The disconnect has been particularly described for an application wherein a disconnect is used in a flexible flow line which interconnects a portable transport to the bulkhead. As previously explained, the disconnect may also be used in a flow line which interconnects the bulkhead to a portable transport. More importantly, however, it should be understood that this application for the disconnect is exemplary, and the low emissions disconnect in the present invention may be used in a variety of applications in a variety of flow lines, and is particularly well suited for applications wherein it is desirable to substantially minimize the loss of fluid and the resulting contamination during each disconnect operation.

What is claimed is:

1. A low emission disconnect for positioning along a fluid flow line, the disconnect comprising:

a valve body having an external male thread portion;

a ball mounted within the valve body and rotatable about a stem axis between an opened position and a closed position;

a union housing for sealed engagement with the valve body;

a female body having an internal female thread thereon for threaded engagement with the male thread on the valve body to bring the union housing into sealed engagement with the valve body;

a poppet member linearly moveable within the union housing from an opened position to a closed position, the poppet member having an upstream end for positioning within the valve body and a linearly opposing downstream end, the upstream end having an end surface substantially conforming to an exterior surface of the ball when the ball is in the closed position;

the upstream end of the poppet member having an exterior cylindrical surface for guided engagement with an interior cylindrical surface on the union housing when the poppet member moves to the closed position;

one or more guide members each spaced linearly opposite the end surface with respect to the exterior cylindrical surface for guiding movement of the poppet member with respect to the union housing between the opened and the closed position; and a biasing member for biasing the poppet member to the closed position.

2. The low emission disconnect as defined in claim 1, wherein the linear movement of the poppet member between the opened and the closed positions is greater than the a nominal diameter of a flow passageway through the ball.

3. The low emission disconnect as defined in claim 1, further comprising:

a downstream seal for sealing engagement between the ball and the valve body when the ball is in the closed position; and the end surface on the poppet member has a diameter substantially conforming to the diameter of the downstream seal.

4. The low emission disconnect as defined in claim 1, further comprising:

a compression seal for sealing between the valve body and the union housing; and a poppet seal for sealing between the poppet member and the union housing when the poppet is in the closed position.

5. The low emission disconnect as defined in claim 4, further comprising:

a downstream seal for sealing engagement between the ball and the valve body when the ball is in the closed position; and the fluid volume between the downstream seal and the poppet seal being less than 8 ccs for a disconnect sized for accommodating a 2" flow line.

6. The low emission disconnect as defined in claim 1, wherein the one or more guide members comprise a plurality of linearly spaced pins each extending radially outward from the poppet member.

7. The low emission disconnect as defined in claim 1, wherein the poppet member is a sleeve-shaped member having a plurality of flow apertures circumferentially spaced about the sleeve member for transmitting fluid through the poppet member.

8. The low emission disconnect as defined in claim 1, wherein the female body is rotatable with respect to the union housing.

9. The low emission disconnect as defined in claim 1, further comprising:

one or more protrusions extending linearly from the female body and opposite the downstream end of the poppet member with respect to the end surface on the upstream end of the poppet member for preventing inadvertent movement of the poppet member to the opened position when the union housing is disconnected from the valve body.

10. The low emission disconnect as defined in claim 1, wherein the biasing member is a coil spring for biasing the poppet member to the closed position.

11. The low emission disconnect as defined in claim 1, wherein the union housing includes a tapered surface adjoining the interior cylindrical surface for guiding the poppet member when moving to the closed position.

12. The low emission disconnect as defined in claim 1, further comprising:

the valve body including a tail piece containing the male thread therein;

a compression seal for sealing with the valve body; and an annular groove in the tailpiece for receiving another seal, such that the union housing and female body may be disconnected from the valve body, a spacer spaced between the compression seal and the another seal and the valve body fluidly connected with another union.

13. A low emission disconnect for positioning along a fluid flow line, the disconnect comprising:

a valve body having an external male thread portion;

a ball mounted within the valve body and rotatable about a stem axis between an opened position and a closed position;

a downstream seal for sealing engagement between the ball and the valve body when the ball is in the closed position;

a union housing for sealed engagement with the valve body;

a female body rotatable with respect to the union housing and having an internal female thread thereon for threaded engagement with the male thread on the valve body to bring the union housing into sealed engagement with the valve body;

a compression seal for sealing between the valve body and the union housing;

a poppet member linearly moveable within the union housing from an opened position to a closed position, the poppet member having an upstream end for positioning within the valve body and a linearly opposing downstream end, the upstream end having an end surface substantially conforming to an exterior surface of the ball when the ball is in the closed position, the end surface on the poppet member having a diameter substantially conforming to the diameter of the downstream seal;

a poppet seal for sealing between the poppet member and the union housing when the poppet is in the closed position, the upstream end of the poppet member having an exterior cylindrical surface for guided engagement with an interior cylindrical surface on the union housing when the poppet member moves to the closed position, the poppet member being a sleeve-shaped member having a plurality of flow apertures circumferentially spaced about the sleeve member for transmitting fluid through the poppet member, one or more guide members each spaced linearly opposite the end surface with respect to the exterior cylindrical surface for guiding movement of the poppet member with respect to the union housing between the opened and the closed position; and a coil spring for biasing the poppet member to the closed position.

14. The low emission disconnect as defined in claim 13, wherein the linear movement of the poppet member between the opened and the closed positions is greater than the a nominal diameter of a flow passageway through the ball.

15. The low emission disconnect as defined in claim 13, wherein the one or more guide members comprise a plurality of linearly spaced pins each extending radially outward from the poppet member.

16. The low emission disconnect as defined in claim 13, further comprising:

the interior cylindrical surface on the union housing for guided engagement with the poppet member having a diameter less than an interior cylindrical surface of a downstream portion of the union housing.

17. The low emission disconnect as defined in claim 13, wherein the union housing includes a tapered surface adjoining the interior cylindrical surface for guiding the poppet member when moving to the closed position.

18. A disconnect for positioning along a fluid flow line, the disconnect comprising:

a valve body having an external male thread portion;

a ball mounted within the valve body and rotatable about a stem axis between an opened position and a closed position;

a downstream seal for sealing engagement between the ball and the valve body when the ball is in the closed position;

a union housing for sealed engagement with the valve body;

a female body rotatable with respect to the union housing and having an internal female thread thereon for threaded engagement with the valve body;

a first compression seal for sealing with the valve body;

a second compression seal for sealing with the union housing; and an annular spacer positioned within the valve body and in sealed engagement with both the first compression seal and the second compression seal.

19. The disconnect as defined in claim 18, further comprising:

a first annular grove and a second annular grove each in the valve body for receiving the first compression seal and the second compression seal, respectively.

20. The disconnect as defined in claim 18, further comprising:

an upstream seal for sealing between the ball and the valve body when the ball is in the closed position.

* * * * *